US011810552B2

(12) United States Patent
Moritz et al.

(10) Patent No.: US 11,810,552 B2
(45) Date of Patent: Nov. 7, 2023

(54) ARTIFICIAL INTELLIGENCE SYSTEM FOR SEQUENCE-TO-SEQUENCE PROCESSING WITH ATTENTION ADAPTED FOR STREAMING APPLICATIONS

(71) Applicant: Mitsubishi Electric Research Laboratories, Inc., Cambridge, MA (US)

(72) Inventors: Niko Moritz, Cambridge, MA (US); Takaaki Hori, Cambridge, MA (US); Jonathan Le Roux, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 215 days.

(21) Appl. No.: 17/366,751

(22) Filed: Jul. 2, 2021

(65) Prior Publication Data

US 2023/0017503 A1    Jan. 19, 2023

(51) Int. Cl.
*G10L 15/16* (2006.01)
*G06N 3/04* (2023.01)
*G10L 15/26* (2006.01)
*G10L 15/30* (2013.01)

(52) U.S. Cl.
CPC .............. *G10L 15/16* (2013.01); *G06N 3/04* (2013.01); *G10L 15/26* (2013.01); *G10L 15/30* (2013.01)

(58) Field of Classification Search
CPC ......... G10L 15/16; G10L 15/26; G10L 15/30; G06N 3/04

USPC .......................................................... 704/232
See application file for complete search history.

(56) References Cited

U.S. PATENT DOCUMENTS

| 11,238,843 B2* | 2/2022 | Arik ..................... G10L 13/08 |
| 11,557,283 B2* | 1/2023 | Moritz ................. G10L 15/16 |
| 2022/0076100 A1* | 3/2022 | Hori .................... G06N 3/045 |

OTHER PUBLICATIONS

Yu et al. Dual mode asr Unify and improve streaming asr with full context modeling. XPO81865705 Published as a conference paper at ICLR 2021. arXiv:2010.06030v2 Jan. 27, 2021.
Narayanan et al. Cascaded encoders for unifying streaming and non streaming asr.arXiv:2010.14606v1 Oct. 27, 2020.
Tripathi et al. transformer transducer one model unifying streaming and non streaming speech recognition. arXiv:2010.03192v1. Oct. 7, 2020.

* cited by examiner

*Primary Examiner* — Susan I McFadden
(74) *Attorney, Agent, or Firm* — Gennadiy Vinokur; Hironori Tsukamoto

(57) ABSTRACT

The present disclosure provides an artificial intelligence (AI) system for sequence-to-sequence modeling with attention adapted for streaming applications. The AI system comprises at least one processor; and memory having instructions stored thereon that, when executed by the processor, cause the AI system to process each input frame in a sequence of input frames through layers of a deep neural network (DNN) to produce a sequence of outputs. At least some of the layers of the DNN include a dual self-attention module having a dual non-causal and causal architecture attending to non-causal frames and causal frames. Further, the AI system renders the sequence of outputs.

13 Claims, 12 Drawing Sheets

ARTIFICIAL INTELLIGENCE SYSTEM FOR SEQUENCE-TO-SEQUENCE PROCESSING WITH ATTENTION ADAPTED FOR STREAMING APPLICATIONS

TECHNICAL FIELD

The present disclosure generally relates to artificial intelligence (AI), and more specifically to an AI system for sequence-to-sequence modeling with attention adapted for streaming applications.

BACKGROUND

Nowadays, a self-attention mechanism has become a central component in many neural network (NN) architectures for different artificial intelligence (AI) applications solving a sequence-to-sequence problem. Examples of sequence-to-sequence problems include machine translation, speech processing, language modeling, automatic speech recognition (ASR), computer vision, and the like. The self-attention mechanism allows inputs to interact with each other ("self") and find out who they should pay more attention to ("attention") to compute outputs in the best way for a given task. The self-attention mechanism is advantageous for solving a sequence-to-sequence problem when an entire input sequence is available for processing. However, waiting for the entire input sequence derived from a time-dependent signal causes neural networks with a self-attention module for processing a time sequence to have output delays making them less applicable to online or streaming sequence-to-sequence processing, where low delays are required.

For example, in speech processing applications, to interpret a speech utterance "she eats a green apple," the self-attention mechanism may place different attention for interpreting different parts of the speech utterance. For example, the word "apple" may be more important to interpret the word "eats" than the word "green." Hence, during the interpretation of the word "eats," the self-attention module can learn to place more attention on the word "apple" rather than on the word "green." However, to place higher attention on the word "apple," the self-attention module should wait until the word "apple" becomes available for processing. Hence, in this example, to interpret a beginning of a sentence, the self-attention module needs to wait until the end of the sentence, thereby incurring processing delays.

Restricted self-attention may partly address this shortcoming of the self-attention mechanism. While the self-attention mechanism processes the entire input sequence to interpret each of its inputs, the restricted self-attention interprets a current input of the input sequence by looking over a limited horizon ahead of the current input. Typically, the input sequence includes a sequence of input frames, so for interpreting a current frame the restricted self-attention considers only a limited number of frames following the current frame. The frames following the current frame are referred to herein as look-ahead frames or just look-ahead, and a number of look-ahead frames is referred to herein as a look-ahead size.

The restricted self-attention may degrade the performance of the self-attention module, but reduces the delay of the sequence-to-sequence processing. For example, when the look-ahead size is two frames, the restricted self-attention delays the interpretation of each current frame by only two frames, which can be tolerable for the streaming application.

However, in practice, the self-attention modules form a complex architecture within a structure of deep neural networks, where multiple self-attention modules are used within layers stacked on top of each other, each layer using as input the output of the preceding layer. The structure of the deep neural network improves the performance of the sequence-to-sequence processing in terms of accuracy, but this comes at the expense of an increased processing delay. For example, when the restricted self-attention module introduces a processing delay of two frames and a deep neural network includes 12 consecutive self-attention-based layers to improve the accuracy of the processing, a total delay becomes 24 frames although each self-attention layer only used 2 look-ahead frames. As a result, a designer of the deep neural network needs to balance the accuracy with the delay of the processing. There is also a need to balance the look-ahead size of the individual self-attention layer compared to the total delay of the DNN to provide a satisfactory performance of the sequence-to-sequence processing without requiring large total delays.

SUMMARY

It is an object of some embodiments to provide an artificial intelligence (AI) system for sequence-to-sequence processing with self-attention adapted for streaming applications. Additionally or alternatively, it is an object of some embodiments to provide a dual self-attention module that can provide performance guarantees without requiring large processing delays of the sequence-to-sequence processing. Additionally or alternatively, it is an object of some embodiments to provide a dual self-attention module that can be used to form deep neural networks of various architectures without accumulating the processing delay of each layer.

Some embodiments are based on understanding that self-attention, as well as a restricted self-attention, has a non-causal architecture. The words causal and non-causal are terms of the art of signal processing and are used herein in their plain meaning. For example, in signal processing, a causal filter is a linear and time-invariant causal system, where the word 'causal' indicates that the filter output depends only on past and present inputs. A filter whose output also depends on future inputs is non-causal. Hence, as used herein, the non-causal architecture of a self-attention module interprets a current input frame using past, current as well as future inputs coming after the current input frame.

Similarly, a restricted self-attention module can be implemented using a causal architecture. Such architecture does not use future information and thus does not introduce any delays. As a result, any combination of causal self-attention may not cause any additional delays. However, the performance of sequence-to-sequence processing using causal self-attention is worse than the performance of non-causal self-attention. To that end, it is an object of some embodiments to combine the causal architecture with the non-causal architecture for the data streaming applications to make use of the advantages of both.

Some embodiments are based on the realization that the non-causal architecture uses two main principles. The first principle is a manner of attending to the input frames, and the second principle is the nature of the input frames. In non-causal architecture, both the principles are non-causal. Specifically, the non-causal self-attention attends to future look-ahead frames, and hence the manner of attending is non-causal. Also, the second principle prescribes that look-ahead frames should be produced according to the non-causal principles in consideration of future data. Hence, a way of producing the look-ahead frames may also be non-causal. As a result, according to both non-causal principles, a non-causal architecture with a look-ahead size of two frames needs to attend to two future look-ahead frames that in turn may have been produced with another two future look-ahead frames that in turn may have been produced with another two look-ahead frames and so on, following the depth of a neural network using the self-attention modules.

Some embodiments are based on the realization that the principles of the non-causal architecture can be modified by providing a dual causal and non-causal (DCN) architecture. In the DCN architecture, the manner of attending to the input frames remains non-causal, however, the input frames themselves may be causal or non-causal. Additionally or alternatively, in the DCN architecture, the manner of attending to the input frames may be causal or non-causal, and the input frames may be causal or non-causal. As referred to herein, a causal input or a causal frame is an input or frame produced without consideration of one or multiple future inputs, while the non-causal input or non-causal frame is an input or frame produced with consideration of one or multiple future inputs. As a result, the causal inputs within the non-causal architecture of a deep neural network (DNN) can be used to reduce total processing delay with only partial reduction of accuracy.

In some embodiments, the look-ahead frames of the non-causal self-attention process are causal frames, while other frames attended to correspond to non-causal frames. When the look-ahead frames are causal, a preceding dual self-attention module does not need additional look-ahead frames to produce them. Notably, having non-causal past frames does not introduce any additional delays if the look-ahead size of the non-causal past frames is no longer than their distance in the past from the present frame. As such, the embodiments can use as many non-causal frames as possible thereby limiting the reduction of performance, while using only causal look-ahead frames thereby limiting the processing delay.

Some embodiments are based on the understanding of a need to produce the causal frames, such as causal look-ahead frames, in a manner consistent with the non-causal frames thereby allowing the DCN architecture to use the causal and the non-causal frames together. To that end, some embodiments use dual self-attention maintaining both the causal architecture and the non-causal architecture operating in parallel to each other. The causal architecture processes its input in a causal manner thereby producing causal outputs without look-ahead. The non-causal architecture processes its input in a non-causal manner with the look-ahead of a predetermined size with respect to the input frame to output non-causal outputs. In some implementations, these look-ahead frames are causal frames copied from the causal architecture.

Hence, the dual self-attention module having DCN architecture may output causal and non-causal outputs. The causal and non-causal outputs may be propagated through layers of the DNN including the dual self-attention. In such a manner, the non-causal architecture of the dual self-attention has access to both causal frames produced by the causal architecture of the dual self-attention of a previous layer of the DNN and non-causal frames produced by the non-causal architecture of the dual self-attention of the previous layer of the DNN. Notably, overall output of the DNN can include one or a combination of the causal outputs and the non-causal outputs. However, because the non-causal output is generally more accurate than the causal output, in one embodiment, the sequence of outputs includes only the non-causal outputs.

Some embodiments are based on the realization that internally, the dual self-attention transforms the sequence of input frames into a sequence of keys, values, and query frames. A relationship of queries to keys and keys to values is differentiable. In such a manner, an attention mechanism can learn to reshape the relationship between a search input and inputs providing context as the DNN learns.

To that end, each query frame of the sequence of queries searches over the sequence of keys to compute the relationship of each keyframe relative to the query frame. Each keyframe is related to a value frame that encodes features about each input frame. The computed relationship of each keyframe relative to the query frame is used to assign a weighting factor to each value frame for computing a weighted average of the sequence of value frames and an output for the query search. For example, if each input frame of the sequence of input frames corresponds to a word in a sequence of words, i.e., a sentence, the estimated relationship of each keyframe relative to a query frame would denote the relationship of the word associated with the query frame to all other words in the sentence.

Accordingly, to compute the non-causal outputs, the non-causal architecture of the dual self-attention needs to copy causal look-ahead key and value frames allowing non-causal query frames to attend to non-causal past and current keyframes and causal look-ahead keyframes to produce weights for past and current non-causal value frames and the causal look-ahead value frames to produce the non-causal output.

Some embodiments are based on another realization that the quality of the dual self-attention module can be further improved by minimizing the usage of the causal frames whenever possible. To that end, in some embodiments, the causal architecture is using past and present non-causal frames copied from the non-causal architecture that do not require any information beyond a current query frame position, while the non-causal architecture uses causal look-ahead frames copied from the causal architecture.

Some embodiments are based on understanding that the DNN with layers having the dual-self attention modules can be used as a primary interpreter of the sequence-to-sequence problem and/or can form a part of more complex neural network architecture. For example, in one embodiment, the DNN is trained with a connectionist temporal classification (CTC) objective to output interpretation of the audio input. For example, for automatic speech recognition (ASR) applications, the DNN is trained to output transcription of speech utterances. Additionally or alternatively, the DNN may be trained as an encoder to output encoder states that can later be transformed into a desired form of output. In one example, such a later transformation can be done with a help of an extra projection layer trained together with the DNN. In another example, the DNN is forming a dual self-attention encoder in an encoder/decoder architecture, wherein the decoder is also a deep neural network.

For example, in one embodiment, an encoder neural network and the extra projection layer are trained with a CTC objective function. This embodiment is advantageous because the CTC-based neural network can also be applied to a streaming application. In another example, the encoder is followed by an attention-based decoder neural network. This embodiment is less easy to be used for the streaming application but may provide more accurate interpretation results than the CTC-based neural network.

In yet another embodiment, outputs of the dual self-attention encoder is processed by multiple different decoders working together to achieve better results. For example, the output of the dual self-attention encoder is processed by the CTC and the attention-based decoder to improve the overall decoding. Additionally or alternatively, in one embodiment, CTC-based output triggers the execution of the attention-based decoder to adapt the attention-based decoder for the streaming applications. To that end, some embodiments provide a speech recognition system comprising the dual self-attention encoder combined with the attention-based decoder.

Accordingly, one embodiment discloses an artificial intelligence (AI) system adapted for data streaming applications. The AI system comprises at least one processor; and memory having instructions stored thereon that, when executed by the at least one processor, cause the AI system to process each input frame in a sequence of input frames through layers of a deep neural network (DNN) to produce a sequence of outputs, wherein at least some of the layers include a dual self-attention module having a dual causal and non-causal architecture attending to non-causal frames and causal frames; and render the sequence of outputs.

Accordingly, another embodiment discloses an audio processing method. The audio processing method comprises processing each input frame in a sequence of input frames through layers of a deep neural network (DNN) to produce a sequence of outputs, wherein at least some of the layers include a dual self-attention module having a dual causal and non-causal architecture attending to non-causal frames and causal frames, and rendering the sequence of outputs.

Accordingly, yet another embodiment discloses a non-transitory computer readable storage medium embodied thereon a program executable by a processor for performing a method, the method comprising: processing each input frame in a sequence of input frames through layers of a deep neural network (DNN) to produce a sequence of outputs, wherein at least some of the layers include a dual self-attention module having a dual causal and non-causal architecture attending to non-causal frames and causal frames; and rendering the sequence of outputs

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
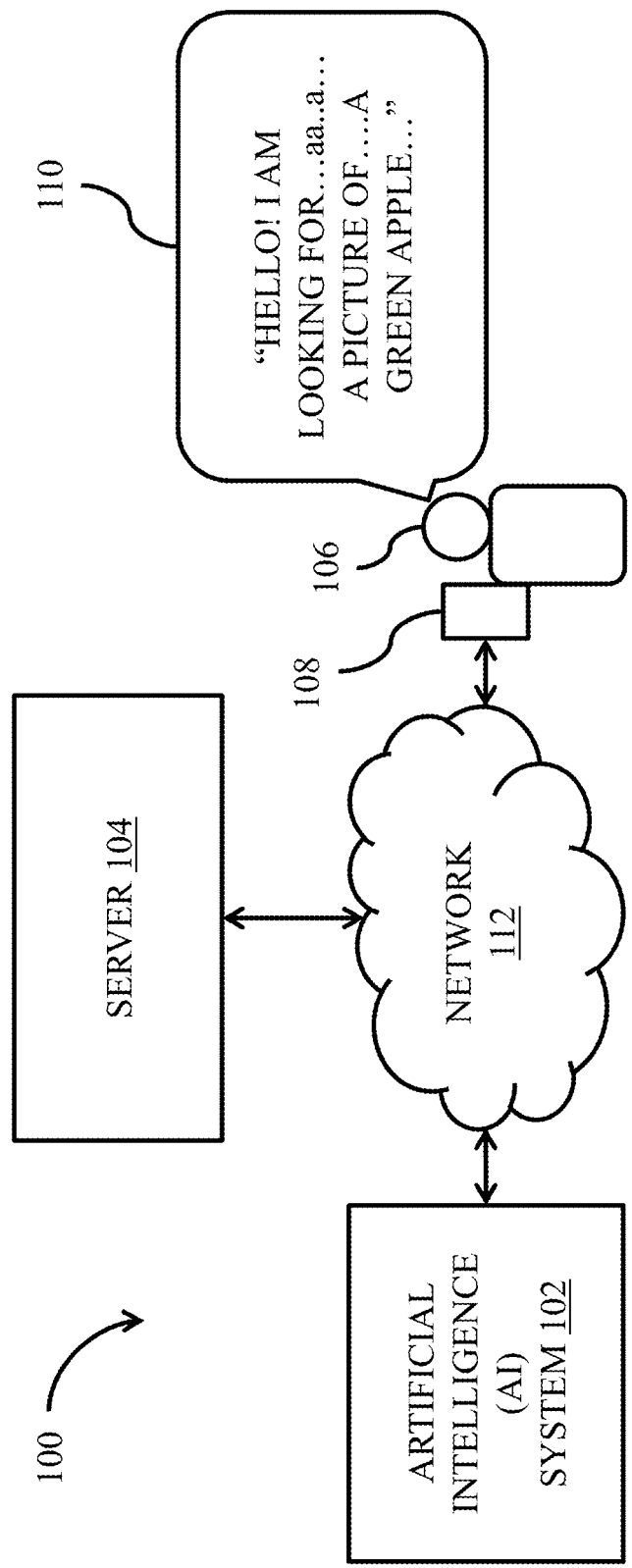
FIG. 1 is a block diagram that illustrates a network environment for implementing an Artificial Intelligence (AI) system, according to some embodiments of the present disclosure.

FIG. 1 is a block diagram that illustrates a network environment 100 for implementing an Artificial Intelligence (AI) system 102, according to some embodiments of the present disclosure. The network environment 100 is depicted to include a user 106 associated with a user device 108. In an illustrative example scenario, the user 106 provides an input, such as an audio input 110 to the user device 108. The user device 108 may receive the audio input 110 as an acoustic signal or as a speech utterance. The user device 108 may include an application, for example, automatic speech recognition (ASR), hosted by a server 104. The audio input 110 may be provided to the server 104, via a network 112. The server 104 may be configured to process the audio input 110 to execute different related to the ASR for data streaming applications.

Further, the network 112 may include suitable logic, circuitry, and interfaces that may be configured to provide a plurality of network ports and a plurality of communication channels for transmission and reception of data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 112 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 112 may include, but is not limited to, a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In some embodiments, the audio input 110 may be lengthy. In such cases the computational complexity of the server 104 may be high. Accordingly, the server 104 may not process the audio input 110 timely, which may result in generating a delayed output. Also, because processing the lengthy audio input 110 may take time, this results into delayed responses to the user inputs. To that end, some embodiments disclose the AI system 102 that can generate accurate outputs with less delay time.

Figure 2A:
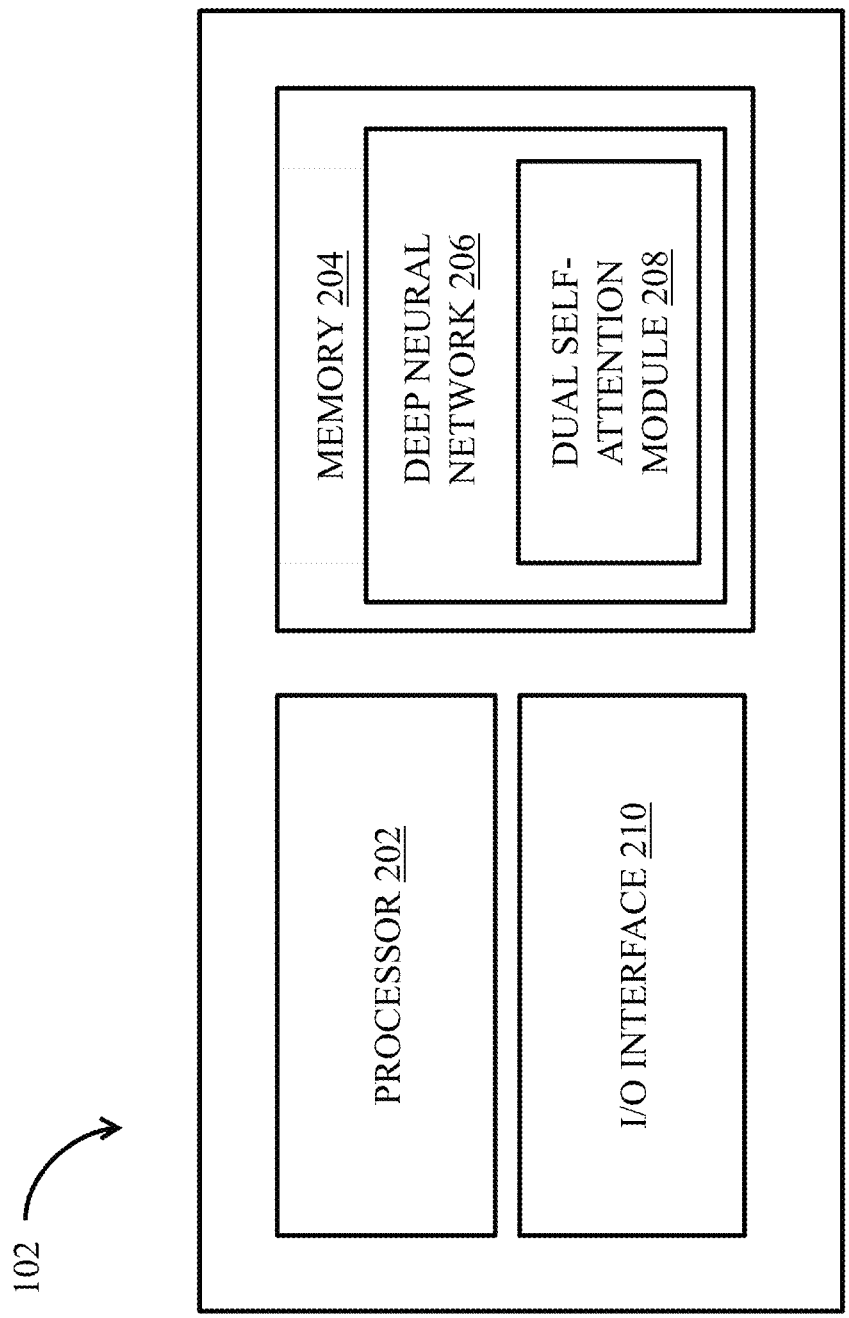
FIG. 2A is a block diagram of the AI system, exemplarily illustrated in FIG. 1, according to some embodiments of the present disclosure.

FIG. 2A is a block diagram of the AI system 102, exemplarily illustrated in FIG. 1, according to some embodiments of the present disclosure. The AI system 102 is adapted for data streaming applications. The AI system 102 includes a processor 202, a memory 204 and an input/output (I/O) interface 210. In an example embodiment, the I/O interface 210 is configured to receive a sequence of inputs, where the sequence of inputs may correspond to an audio input (such as the audio input 110) having a temporal dimension. Further, the processor 202 is configured to execute instructions stored in the memory 204. The execution of the stored instructions causes the AI system 102 to accept the sequence of input frames. The sequence of input frames denote a sequence of ordered features describing information of an input signal (such as the audio input 110).

Some embodiments are based on understanding that a self-attention, as well as a restricted self-attention, has a non-causal architecture. The words causal and non-causal are terms of art of signal processing and are used herein in their plain meaning. For example, in signal processing, a causal filter is a linear and time-invariant causal system, where the word 'causal' indicates that the filter output depends only on past and present inputs. A filter whose output also depends on future inputs is non-causal. Hence, as used herein, the non-causal architecture of a self-attention module interprets a current input frame using past, current as well as future inputs coming after the current input frame.

Similarly, a restricted self-attention module can be implemented using a causal architecture. Such architecture does not use future information and thus does not introduce any delay. As a result, any combination of causal self-attention modules may not cause any additional delay. However, performance of sequence-to-sequence processing using causal self-attention is poor than performance of non-causal self-attention. To that end, it is an object of some embodiments to combine the causal architecture with the non-causal architecture for the data streaming applications to make use of the advantages of both.

Some embodiments are based on the realization that the non-causal architecture uses two main principles. The first principle is a manner of attending to the input frames, and the second principle is the nature of the input frames. In the non-causal architecture, both the principles are non-causal. Specifically, the non-causal self-attention attends to future look-ahead frames, and hence the manner of attending is non-causal. Also, the second principle prescribes that look-ahead frames should be produced according to the non-causal principles in consideration of future data. Hence, a way of producing the look-ahead frames is also non-causal. As a result, a non-causal architecture with a look-ahead size of two frames needs to attend to two future look-ahead frames that in turn may have been produced with another two future look-ahead frames that in turn may have been produced with another two look-ahead frames and so on, following the depth of a neural network using the self-attention modules.

Some embodiments are based on the realization that the principles of the non-causal architecture can be modified by providing a dual causal and non-causal (DCN) architecture. In the DCN architecture, the manner of attending to the input frames remains non-causal, however, the input frames themselves may be causal or non-causal. Additionally or alternatively, in the DCN architecture, the manner of attending to the input frames may be causal or non-causal, and the input frames may be causal or non-causal. As referred to herein, a causal input or a causal frame is an input or frame produced without consideration of one or multiple future inputs, while the non-causal input or non-causal frame is an input or frame produced with consideration of one or multiple future inputs. As a result, the causal inputs within the non-causal architecture of a deep neural network can be used to reduce total processing delay with only partial reduction of accuracy.

To that end, in an embodiment, the memory 204 includes a deep neural network (DNN) 206. The DNN 206 may include layers and at least some of the layers include a dual self-attention module 208 having the DCN architecture.

Figure 2B:
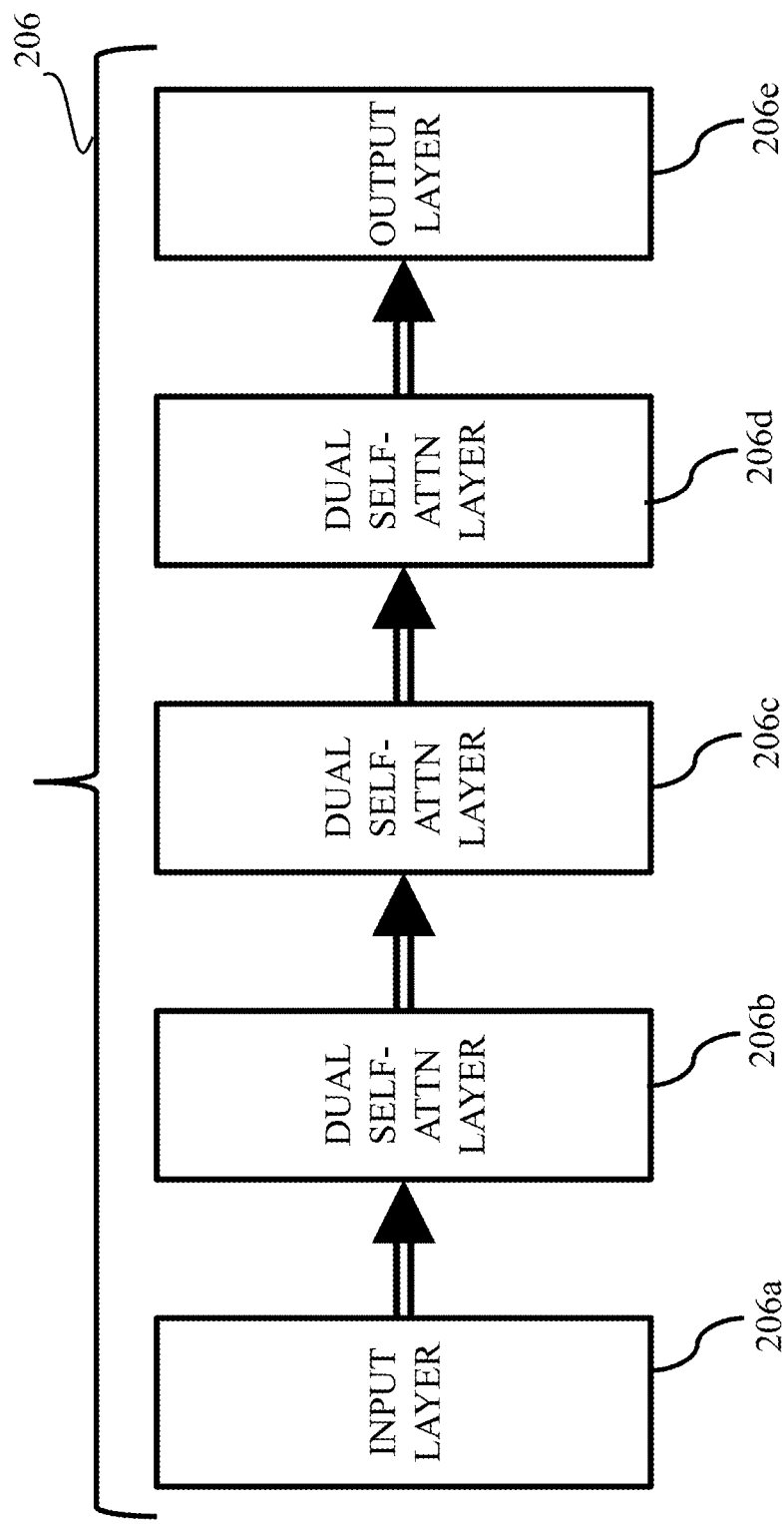
FIG. 2B shows a diagrammatic representation of a deep neural network, according to some embodiments of the present disclosure.

FIG. 2B shows a diagrammatic representation of the DNN 206, according to some embodiments of the present disclosure. The DNN 206 includes layers 206a-206e. Some layers of the layers 206a-206e include the dual self-attention module 208. For example, the DNN 206 includes an input layer 206a, an output layer 206e, and dual self-attention layers 206b, 206d, and 206d. The self-attention layers 206b, 206d, and 206d include the DCN architecture. The processor 202 is configured to process each input frame in the sequence of input frames through the layers of the DNN 206 to produce a sequence of outputs.

Figure 3:
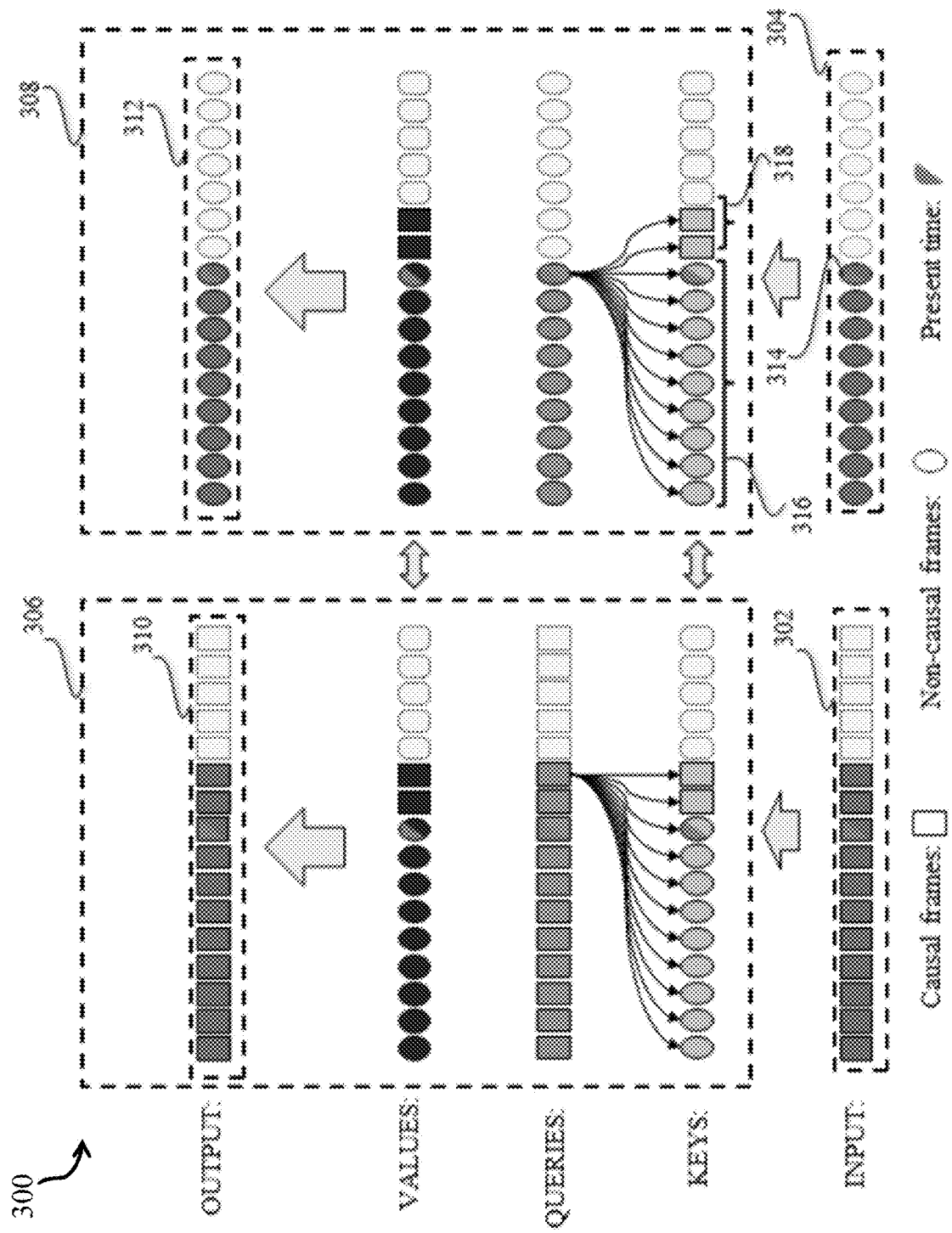
FIG. 3 shows a schematic of a dual causal and non-causal architecture, according to some embodiments of the present disclosure.

FIG. 3 shows a schematic of the DCN architecture 300 to produce the sequence of outputs, according to some embodiments of the present disclosure. The processor 202 duplicates an input feature sequence to derive a causal input frames sequence 302 and a non-causal input frames sequence 304. Further, the DCN architecture 300 transforms the causal input frames and the non-causal input frames into causal and non-causal key, value, and query frames. The DCN architecture 300 includes the causal architecture and the non-causal architecture. The DCN architecture 300 configured to perform a dual-self attention maintaining both the causal architecture and the non-causal architecture operating in parallel to each other. According to an embodiment, the dual self-attention includes a causal self-attention process 306 and a non-causal self-attention process 308. The causal self-attention process 306 and the non-causal self-attention process 308 are executed in parallel.

The causal input frames sequence 302 is fed as an input to the causal self-attention process 306. The causal self-attention process 306 includes processing, by the causal architecture, each causal input frame of the causal input frames sequence 302 in a causal manner, i.e., without the look-ahead frames, to produce a causal output frames sequence 310.

Further, the non-causal input frames sequence 304 is fed as an input to the non-causal self-attention process 308. The non-causal self-attention process 308 includes processing, by the non-causal architecture, each non-causal input frame of the non-causal input frames sequence 304 in a non-causal manner with the look-ahead of a predetermined size with respect to an input frame representing at present time to produce a non-causal output frames sequence 312. In the non-causal self-attention process 308, the look-ahead frames are causal frames, while other frames attended correspond to non-causal frames. For example, to interpret a current input frame 314, look-ahead frames 318 that are causal frames and other frames 316 that are the non-causal frames are attended. When the look-ahead frames are causal, a preceding dual self-attention module does not need additional look-ahead frames to produce them. Notably, having non-causal past frames does not introduce any additional delay. As such, the embodiments can use as many non-causal frames as possible thereby limiting the reduction of performance, while using only causal look-ahead frames thereby limiting the processing delay.

Hence, the DCN architecture 300 of the dual self-attention module 206 outputs the causal output frames sequence 310 and the non-causal output frames sequence 312. Further, the causal output frames sequence 310 and the non-causal output frames sequence 312 may be propagated through the layers of the DNN 206 including the dual self-attention. In such a manner, the non-causal architecture of the dual self-attention has access to both, causal frames produced by the causal architecture of the dual self-attention of a previous layer of the DNN 206 and non-causal frames produced by the non-causal architecture of the dual self-attention of the previous layer of the DNN 206.

According to an embodiment, the causal output frames sequence 310 and the non-causal output frames sequence 312 correspond to the sequence of outputs. However, because non-causal output frames are generally more accurate than causal output frames, in one embodiment, the sequence of outputs includes only the non-causal output frames sequence 312.

Some embodiments are based on the realization that internally, the dual self-attention transforms the sequence of input frames into a sequence of keys, values, and query frames. A relation of queries to keys and keys to values is differentiable. In such a manner, an attention mechanism can learn to reshape the relationship between a search input and inputs providing context as the DNN 206 learns.

To that end, each query frame of the sequence of queries searches over the sequence of keys to compute the relationship of each key frame relative to the query frame. Each key frame is related to a value frame that encodes features about each input frame. The computed relationship of each key frame relative to the query frame is used to assign a weighting factor to each value frame for computing a weighted average of the sequence of value frames and an output for the query search. For example, if each input frame of the sequence of input frames corresponds to a word in a sequence of words, i.e., a sentence, the estimated relationship of each key frame relative to a query frame may denote the relationship of the word associated with the query frame to all other words in the sentence.

Figure 4:
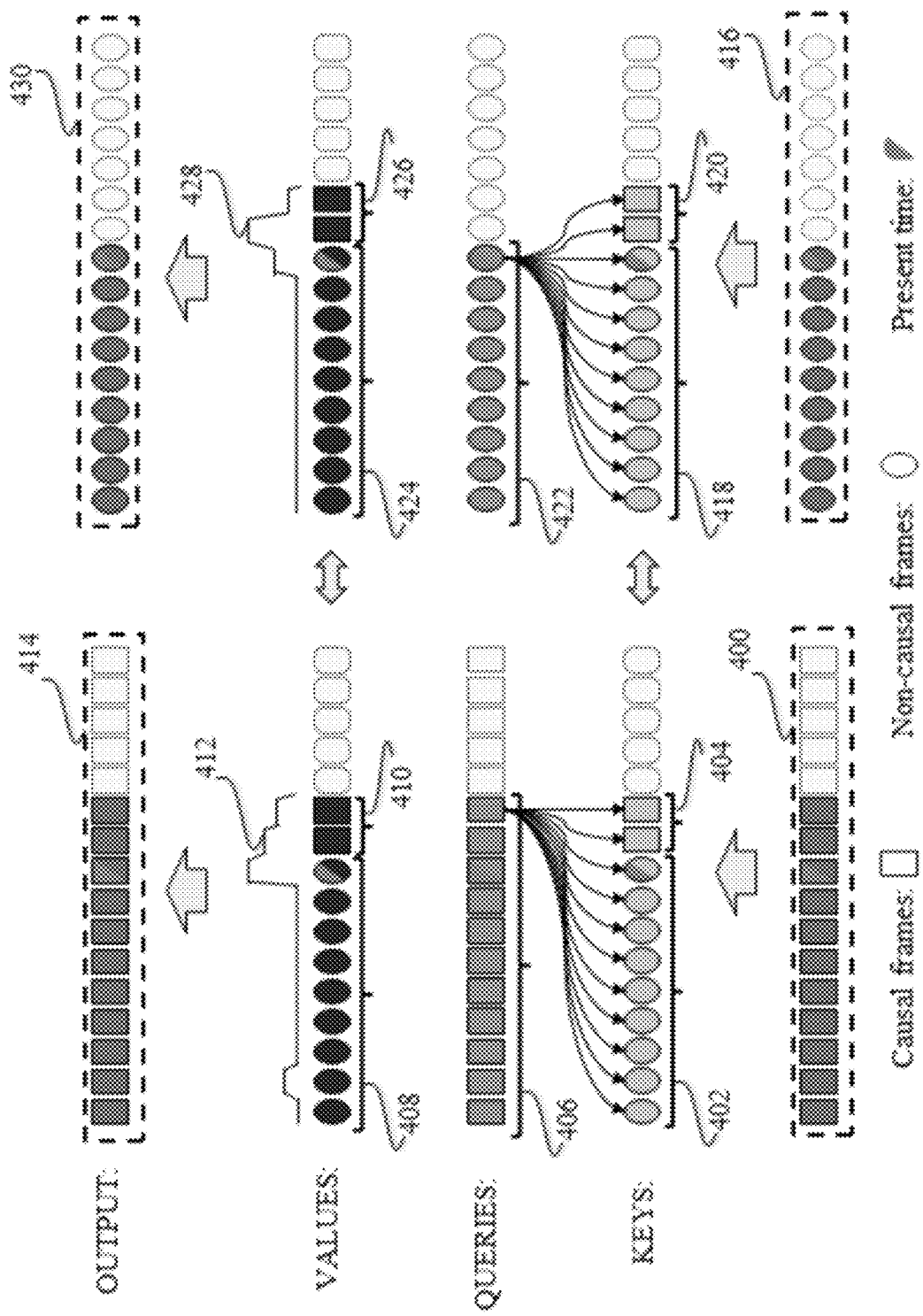
FIG. 4 shows a schematic for weighting each value frame of a sequence of value frames, according to some embodiments of the present disclosure.

FIG. 4 shows a schematic for weighting each value frame of a sequence of value frames, according to some embodiments of the present disclosure. Input causal frames 400 are fed to the causal architecture of the dual self-attention of a current layer of the DNN 206. According to an embodiment, the input causal frames 400 may correspond to causal outputs determined by the causal architecture of the dual self-attention of a previous layer of the DNN 206. The causal architecture of the dual self-attention of the current layer of the DNN 206 transforms the previous causal outputs into a sequence of causal keyframes, causal value frames, and causal query frames to produce current causal outputs 414 by attending the causal query frames to the causal keyframes to weight the causal value frames.

Input non-causal frames 416 are fed to the non-causal causal architecture of the dual self-attention of the current layer of the DNN 206. According to an embodiment, the input non-causal frames 400 may correspond to non-causal outputs determined by the non-causal architecture of the dual self-attention of the previous layer of the DNN 206. The non-causal architecture of the dual self-attention of the current layer of the DNN 206 transforms the previous non-causal outputs into a sequence of non-causal keyframes, non-causal value frames, and non-causal query frames to produce current non-causal outputs 430. Specifically, in an embodiment, the current non-causal outputs 430 are produced by attending the non-causal query frames 422 to non-causal keyframes 418 combined with causal look-ahead keyframes 420 copied from the causal architecture to weight non-causal value frames 424 combined with causal look-ahead value frames 426 copied from the causal architecture. The weights estimated for the non-causal value frames 424 combined with causal look-ahead value frames 426 are represented by 428.

Some embodiments are based on another realization that quality of the dual self-attention module 208 can be further improved by minimizing usage of causal frames whenever possible. To that end, in some embodiments, the causal architecture uses past non-causal frames copied from the non-causal architecture that do not require any information beyond the current query frame position, while non-causal architecture uses causal look-ahead frames copied from the causal architecture.

For example, the causal architecture produces the current causal outputs 414 by attending causal query frames 406 to causal keyframes 404 combined with non-causal keyframes 402 that are copied from the non-causal architecture to weight causal value frames 410 combined with non-causal value frames 408 that are copied from the non-causal architecture. The weights estimated for the causal value frames 410 combined with the non-causal value frames 408 are represented by 412. Additionally or alternatively, the non-causal architecture produces the current non-causal outputs 430 by attending the non-causal query frames 422 to past and present non-causal keyframes 418 combined with the causal look-ahead keyframes 420 copied from the causal architecture to weight the non-causal past and present value frames 424 combined with the causal look-ahead value frames 426 copied from the causal architecture.

Some embodiments are based on understanding that the DNN 206 with layers having the dual-self attention modules can be used as a primary interpreter of the sequence-to-sequence problem and/or can form a part of more complex neural network architecture.

For example, in one embodiment, the DNN 206 is trained with a connectionist temporal classification (CTC) objective to output interpretation of the audio input. For example, for ASR applications, the DNN 206 is trained to output transcription of speech utterances. Additionally or alternatively, the DNN 206 may be trained as an encoder to output encoder states that can later be transformed into a desired form of output. In one example, such a later transformation can be done with a help of an extra projection layer trained together with the DNN 206. In another example, the DNN 206 is forming a dual self-attention encoder in an encoder/decoder architecture, wherein the decoder is also a deep neural network.

For example, in one embodiment, an encoder neural network and the extra projection layer is trained with a CTC objective function. This embodiment is advantageous because the CTC-based neural network can also be applied to streaming application. In another example, the encoder is followed by an attention-based decoder neural network. This embodiment is less easy to be used for the streaming application but may provide more accurate interpretation results than the CTC-based neural network.

In yet another embodiment, outputs of the dual self-attention encoder is processed by multiple different decoders working together to achieve better results. For example, the output of the dual self-attention encoder is processed by the CTC and the attention-based decoder to improve the overall decoding. Additionally or alternatively, in one embodiment, CTC-based output triggers the execution of the attention-based decoder to adapt the attention-based decoder for the streaming applications. To that end, some embodiments provide a speech recognition system comprising the dual self-attention encoder combined with the attention-based decoder.

Figure 5:
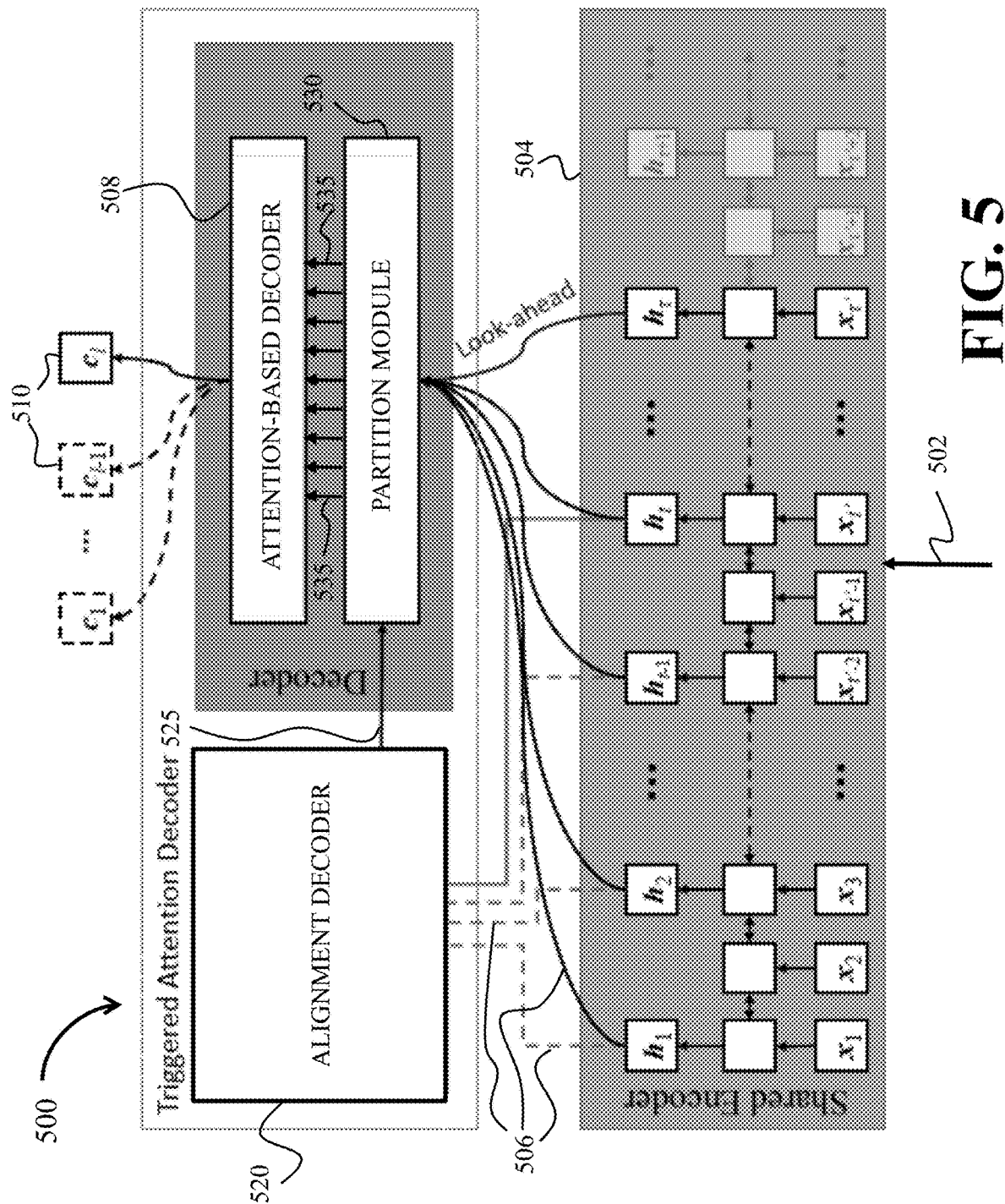
FIG. 5 shows a schematic of a speech recognition system (ASR) configured for end-to-end speech recognition, according to some embodiments.

FIG. 5 shows a schematic of a speech recognition system (ASR) 500 configured for end-to-end speech recognition according to some embodiments. The speech recognition system 500 obtains input acoustic sequences and processes the input acoustic sequences to generate transcription output sequences. Each transcription output sequence is a transcription of an utterance or a portion of the utterance represented by the corresponding input acoustic signal. For example, the speech recognition system 500 can obtain an input acoustic signal 502 and generate a corresponding transcription output 510 that is a transcription of the utterance represented by the input acoustic signal 502.

The input acoustic signal 502 may include a sequence of multiple frames of audio data that is a digital representation of the utterance, e.g., a continuous stream of data. The sequence of multiple frames of the audio data may correspond to a sequence of time steps, e.g., where each frame of the audio data is associated with 25 milliseconds of audio stream data shifted 10 milliseconds further in time from the previous frame of the audio data. Each frame of the audio data in the sequence of multiple frames of the audio data may include feature values for a frame that characterize the portion of the utterance at the corresponding time step. For example, the sequence of multiple frames of audio data may include filter bank spectra feature vectors.

The transcription output 510 may include a sequence of transcription pieces of the utterance represented by the input acoustic signal 502. A transcription output may include one or more characters. For example, a transcription output may be a character or a sequence of characters from a Unicode character set. For example, the character set may include the alphabet of English, Asian, Cyrillic as well as Arabic languages. The character set may also include Arabic numerals, a space character, and punctuation marks. Additionally or alternatively, a transcription output can include bits, words, and other linguistic constructions.

The speech recognition system 500 includes an encoder 504 and an attention-based decoder 508. The encoder 504 may be the dual self-attention encoder. The encoder 504 processes the input acoustic signal 502 and generates a sequence of encoder states 506 providing alternative, e.g., higher, representations for the input acoustic signal 502. The sequence of encoder states 506 may include an alternative sequence of multiple frames of audio data that correspond to a second set of time steps. The attention-based decoder 508 is trained to process the sequence of encoder states 506 representing alternative representations for the input acoustic signal 502 and generate transcription outputs 510 from the sequence of encoder states provided to the attention-based decoder 508.

Some embodiments are based on recognition that an attention-based ASR system may need to observe an entire speech utterance segmented by speech pauses, to assign a weight to each input frame in order to recognize each transcription output 510. Due to the absence of a priori knowledge about which part of an input acoustic signal is relevant to recognize the next transcription output and the need to assign a weight to each encoder state, the attention-based decoder usually needs to process large input sequences. Such a processing allows taking advantage of placing attention to different parts of the utterance but also increases output delays, and thus is not practical for speech recognition in a streaming/online fashion.

As used herein, an output delay of ASR is a difference between time of receiving acoustic frames of a speech utterance and time of recognizing the received acoustic frames. For example, when the attention-based ASR system operates on the entire speech utterance, the recognition of the words in the utterance is delayed until the last word of the utterance is received. Such a delay of recognition causes increased output delays.

Some embodiments are based on realization that an example of a priori knowledge about relevancy of different parts of an input sequence to recognition of the next transcription output is an indication of locations of frames corresponding to the transcription outputs to be recognized in the input sequence. Indeed, if the transcription output locations are known, the attention-based decoder can be forced to place greater attention to these locations and less or no attention to other locations by restricting the input sequence. In such a manner, for each transcription output, the attention-based network can focus its attention around its location in the input sequence. This guided attention reduces the need to process large input sequences, which in turn reduces the output delays making the attention-based decoder practical for recognition in a streaming/online fashion.

To that end, the ASR system 500 includes an alignment decoder 520 trained to determine locations 525 of encoder states in the sequence 506 that encode transcription outputs, such as characters, bits, words, etc. The CTC is a type of objective function and associated neural network output for training recurrent neural networks (RNNs) such as long short-term memory (LSTM) networks to tackle sequence problems where the timing is variable. A CTC-based ASR system is an alternative to an attention-based ASR system. A CTC-based neural network generates an output for each frame of the input sequence, i.e., in- and outputs are synchronized, and a beam search algorithm is used to find the best output sequence before collapsing neural network outputs to an output transcription. The performance of the attention-based ASR systems may be superior to the CTC-based ASR systems. However, some embodiments are based on realization that the in- and output frame alignment used by intermediate operations of the CTC-based ASR system can be used by the attention-based ASR system to address its output delay drawbacks mentioned above.

To take advantage from the alignment information 525 provided by the alignment decoder 520, the ASR system 500 includes a partition module 530 configured to partition the sequence of encoder states 506 into a set of partitions 535. For example, the partition module 530 may partition the sequence of encoder states for each location 525 of identified encoder states, such that a number of partitions 535 is defined by, e.g., equal to, a number of the identified encoder states 525 that encode transcription outputs. In such a manner, the attention-based decoder 508 accepts as an input not the entire sequence 506, but portions of that sequence 535, while each portion is likely to include a new transcription output to form the transcription output sequence 510. In some implementations, the combination of alignment decoder, attention-based decoder and the partition module is referred to as triggered attention decoder. In effect, the triggered attention decoder can process the portion of the utterance as it is received making the ASR system 500 practical for recognition in a streaming/online fashion.

Figure 6A:
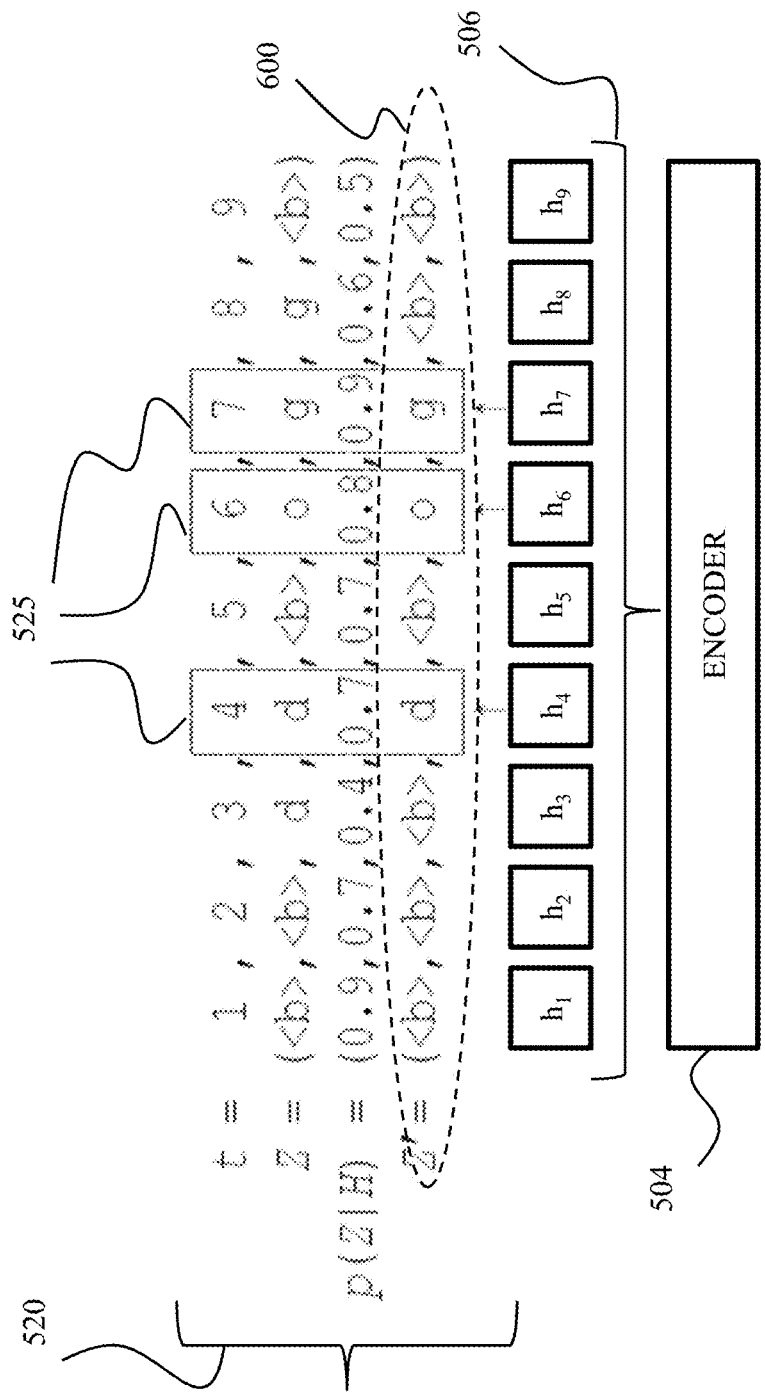
FIG. 6A shows a schematic of an alignment decoder according to some embodiments.

FIG. 6A shows a schematic of the alignment decoder 520 according to some embodiments. One of the objectives of the alignment decoder 520 is to decode the sequence of encoder states 506 produced by the encoder 504. To that end, the alignment decoder 520 is trained to decode the sequence of encoder states 506 to produce a sequence of transcription outputs 600. However, at least some embodiments do not use the decoded transcription outputs 600 of the alignment decoder 520. Instead, some embodiments use intermediate alignment information produced by the alignment decoder 520 to decode the sequence of encoder states 506. In other words, some embodiments ignore the transcription outputs 600 decoded by the alignment decoder 520, but use locations 525 of the encoder states in the sequence 506 to improve performance of the attention-based decoder 508. The rationale behind this approach is that the performance of the attention-based decoder 508 may be better than performance of the alignment decoder 520. To that end, the intermediate alignment information produced by the alignment decoder 520 is used to further improve the performance of the attention-based decoder 508.

In some embodiments, however, the transcription outputs 600 decoded by the alignment decoder 520 are further combined with the transcription outputs decoded by the attention-based decoder 508 to further improve accuracy of recognition. In these embodiments, the alignment decoder 520 is utilized twice: first time to assist partitioning the sequence of encoder states 506 for the attention-based decoder 508 and second time for further improving the accuracy of transcription outputs decoded by the attention-based decoder 508.

FIG. 6A shows an example of operation of the alignment decoder 520 to process an exemplar portion of an utterance with the word "dog". Boxes surrounding elements of indexed sequence identify locations of encoder states 525 that encode the transcription outputs in the sequence of encoder states 506. For example, the encoder 504 converts an input acoustic sequence X of acoustic features such as log-mel spectral energies into a T—encoder state sequence H:

$H = \text{Encoder}(X).$

For example, in one implementation, the feature matrix X is sub-sampled by the encoder neural network to a four-times lower frame rate, such that the encoder output H has a frame rate of 25 Hz when the frame rate of feature matrix X amounts to 100 Hz. Let $Z=(z_1, \ldots, z_T)$ denote a framewise sequence of CTC outputs of length T computed from the encoder states H 506, with $z_t \in \mathcal{U} \cup \varepsilon$, where $\mathcal{U}$ denotes a set of distinct graphemes that can either be single characters or word-pieces, for example, and $\varepsilon$ blank symbol. Let $C=(c_1, \ldots, c_L)$, with $c_l \in \mathcal{U}$, denote a grapheme sequence of length L, such that the sequence Z reduces to C when collapsing repeated labels into single occurrences and removing blank symbols.

In some embodiments, the alignment decoder 520 decodes the sequence of encoder states probabilistically, with the probabilities derived as:

$$p_{ctc}(C|H) = \sum_Z p(C|Z, H)p(Z|H) \approx \sum_Z p(C|Z)p(Z|H) = \sum_Z p(Z|C)p(Z|H)\frac{p(C)}{p(Z)},$$

where p (Z|C) denotes a transition probability and p (Z|H) an acoustic model.

In some embodiments, the alignment decoder 520 identifies a frame with the highest probability within each sub-sequence of frames corresponding to the same grapheme in Z as an identified CTC output. For example, if the sequence Z is written using indices $i_l$ and $j_l$ for beginning and end of occurrence of the l-th label $C_l$ in Z, with $i_l \leq j_l < i_{l+1}$, $\forall l$, and $z_t = c_l$ for all t such that $i_l \leq t \leq j_l$ and $z_t = \varepsilon$ for all other indices. The alignment decoder 520 performs a mapping from a sequence Z to a sequence including a subset of identified encoder states encoding the transcription outputs with highest probability 525 $Z'=(\varepsilon^*, c_1, \varepsilon^*, [0]c_2, \varepsilon^*, \ldots, c_L, \varepsilon^*)$ of same length T, in which * denotes zero or more repetitions and where each $c_l$ occurs exactly once, at the frame with maximum probability within those corresponding to $c_l$, as follows:

$$z'_t = \begin{cases} c_l & \text{if } t = \text{argmax}_{i_l \leq t' \leq j_l} p(z_{t'}|H), \text{ for some } l \in \{1, \ldots, L\}, \\ \langle b \rangle & \text{otherwise.} \end{cases}$$

Alternatively, the alignment decoder 520 may identify the first or last frame within each sub-sequence of frames corresponding to the same grapheme in Z as an identified encoder state.

Figure 6B:
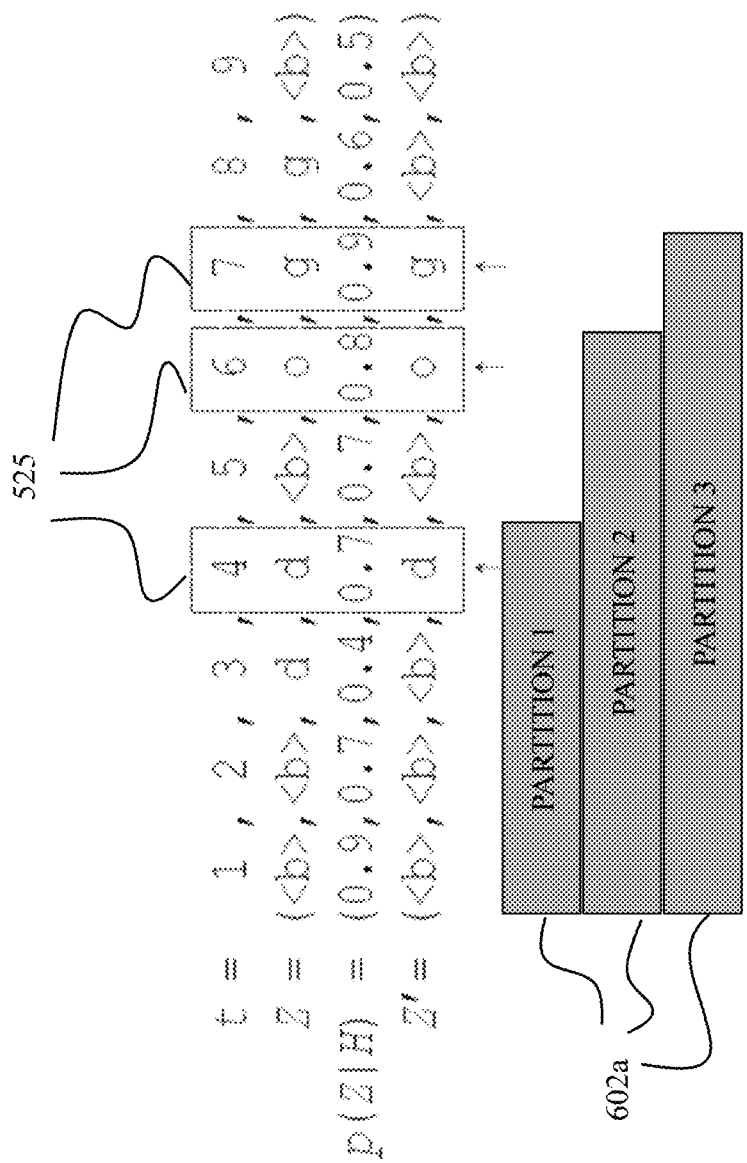
FIG. 6B and FIG. 6C show examples of partitioning a sequence of encoder states according to some embodiments.
Figure 6C:
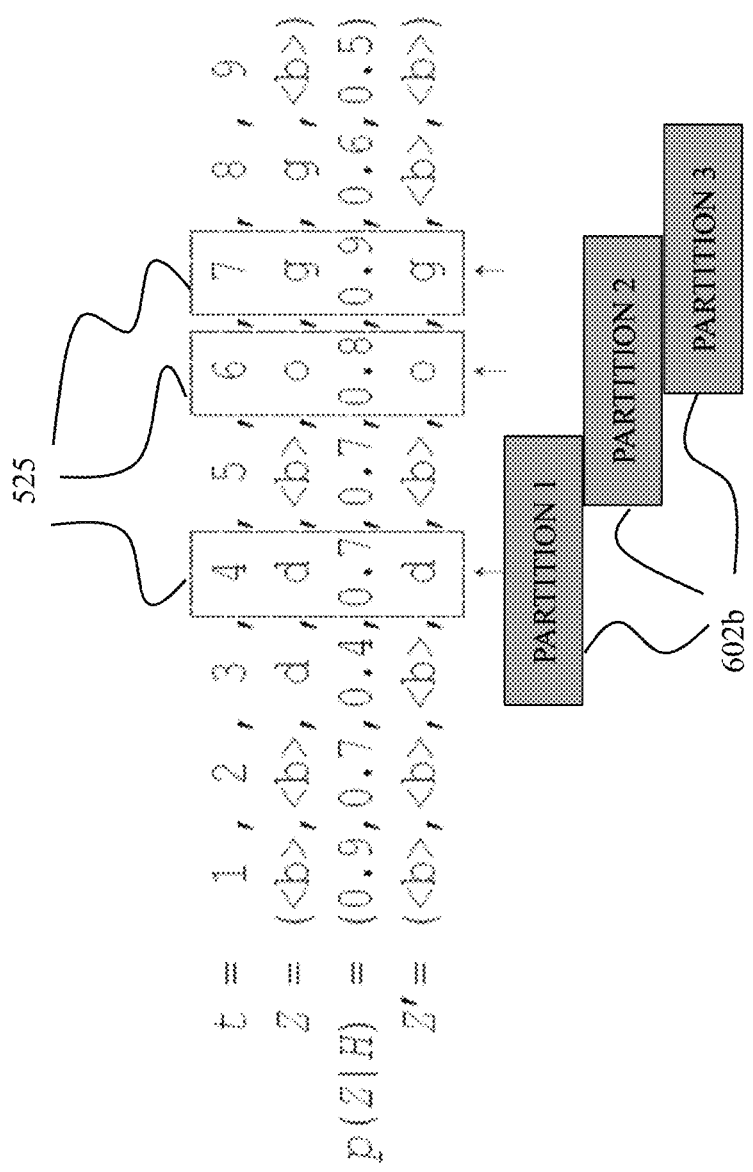

FIG. 6B and FIG. 6C show examples of partitioning the sequence of encoder states 506 according to some embodiments. In various embodiments, partitioning is performed by the partition module 530 operatively connected to the alignment decoder 520, the attention-based decoder 508, and the encoder 504. The partition module 530 is configured to access the alignment information 525 of the alignment decoder 520, partition the sequence of encoder states produced by the encoder 504, and submit sequentially portions 535 of the sequence of encoder states to the attention-based decoder 508.

For example, in one embodiment of FIG. 6B, each partition 602a includes encoder states from beginning of the sequence of encoder states until a look-ahead encoder state determined by shifting a location of an identified encoder state forward with a fixed shift. For example, if a value of the fixed shift is 5, and a location of the identified state encoder is $8^{th}$ in the sequence of the encoder states, the partition 602a includes the first 13 encoder states. If a location of a subsequent identified encoder state is 11, the partition 602a includes the first 16 encoder states. In effect, each partition includes encoder states for new transcription outputs while increasing length of the partition allowing the attention-based decoder 508 to exploit its length.

In alternative embodiment of FIG. 6C, a partition 602b corresponding to a location of an identified encoder state includes a predetermined number of encoder states centered on the location of the identified encoder state. For example, if the predetermined number of encoder states is 7 and the location of the identified encoder state is $15^{th}$ in the sequence of the encoder states, the partition 602b includes encoder states between $12^{th}$ and $18^{th}$ in the sequence of the encoder states 506. In effect, each partition includes encoder states for new transcription outputs while having a fixed length of partition to reduce computational burden on the attention-based decoder 508. Additionally or alternatively, a partition 602b corresponding to a location of an identified encoder state includes a predetermined number of encoder states around the location of the identified encoder state, e.g., shifted from the center to provide off-centered coverage.

Figure 7:
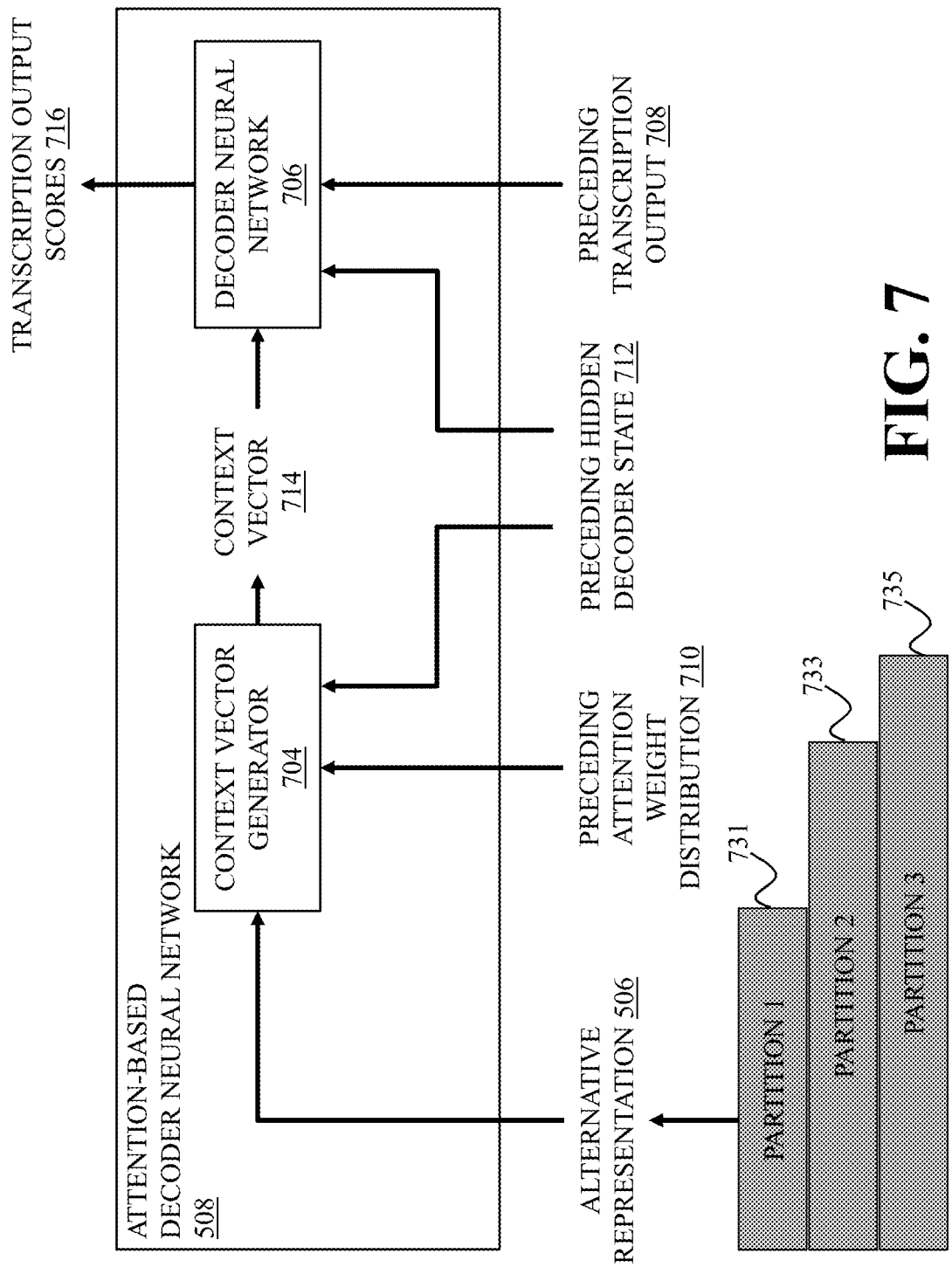
FIG. 7 shows an example of an attention-based decoder according to some embodiments.

FIG. 7 shows an example attention-based decoder 508 according to some embodiments. The attention-based decoder 508 includes a context vector generator 704 and a decoder neural network 706. The context vector generator 704 receives a hidden decoder state 712 of the decoder neural network 706 from a preceding time step, an attention weight distribution 710 of the context vector generator from the preceding time step, and the alternative representation 506, i.e., the alternative representation of the acoustic signal 102 described above with reference to FIG. 5. The context vector generator 704 processes the preceding hidden decoder state of the decoder neural network 706, the preceding attention weight distribution 710, and the alternative representation 506 to compute an attention weight distribution over time frames of the alternative representation 506 and to generate as output a context vector 714 for the time step. The context vector generator 704 provides the context vector 714 for the time step to the decoder neural network 706.

For different iterations, the attention-based decoder 508 receives different partitions 731, 733, and 735. For example, a set of partitions includes a first partition 731 and subsequent partitions 733 and 735. The attention-based decoder 508 processes the first partition 731 to produce a first transcription output. After the attention-based neural network finished processing the first partition that places the attention-based network in its internal state, the attention-based decoder 508 processes the subsequent partitions with the attention-based network without resetting the internal state of the attention-based network to produce transcription outputs for the subsequent partitions one after another.

In effect, the attention-based decoder 508 processes different partitions without resetting the internal state of the attention-based network to take advantage of previously decoded information. Upon determining an end of the speech utterance, the attention-based decoder 508 is configured to reset its internal states.

The decoder neural network 706 receives as input the context vector 714 for the time step as well as the transcription output 708 and the hidden decoder state 712 of the preceding time step. The decoder neural network 706 initializes its internal hidden states with the preceding hidden decoder states 712 prior to processing the context vector 714 for the time step and the transcription output 708 from the preceding time step to generate as output a set of transcription output scores 716 for the time step. In some implementations, the decoder neural network 706 is a recurrent neural network (RNN) with a softmax output layer. Each transcription output score corresponds to a respective transcription output from a set of transcription outputs. For example, as described above with reference to FIG. 5, the set of transcription outputs may be a character or a sequence of characters from a Unicode character set which is used to write one or more natural languages, e.g., the alphabet of English, Asian, Cyrillic, and Arabic languages. The transcription output set may also include Arabic numerals, a space character, and punctuation marks. The score for a given transcription output represents likelihood that the corresponding transcription output is the current transcription piece at the time step in an output sequence that is a transcription of the utterance.

The speech recognition system processes the transcription output scores 716 for each time step to determine a transcription output sequence that represents a transcription of an utterance. For example, for each time step, the speech recognition system may select the transcription output with the highest score from the set of transcription output scores to determine the transcription output sequence.

Figure 8:
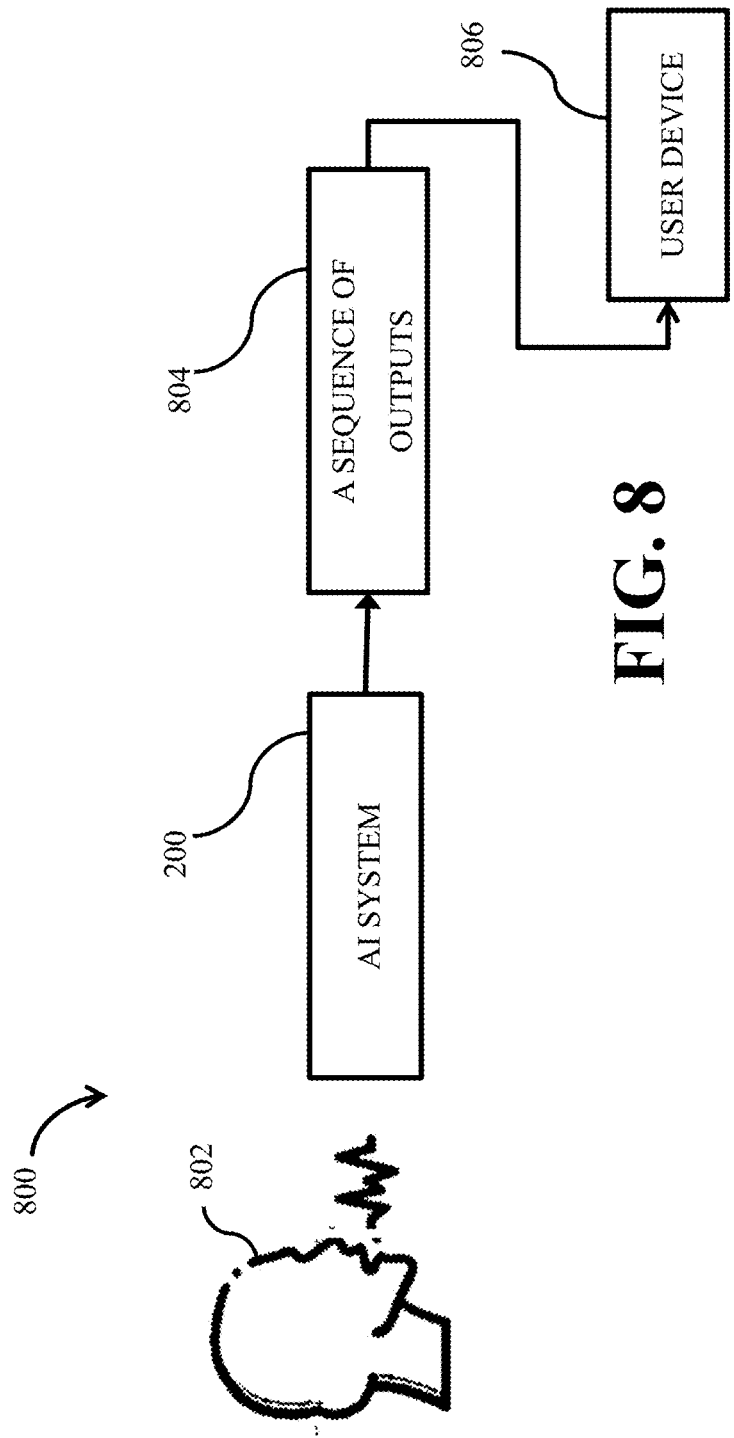
FIG. 8 shows a schematic of a streaming system based on the AI system, according to some embodiments of the present disclosure.

FIG. 8 shows a schematic of a streaming system 800 based on the AI system 102, according to some embodiments of the present disclosure. The AI system 102 captures speech utterance data (or audio data) from a user 802 speaking in a live event. In addition, the AI system 102 may also capture video data of the user 802 speaking. The speech utterance data may comprise a speech utterance. The speech utterance includes a sequence of multiple frames of audio data. The AI system 102 processes each frame of audio data in the sequence of multiple frames of the audio data through layers of the DNN 206, in real-time, to produce a sequence of outputs 804 for streaming and other live applications. The sequence of outputs 804 may correspond to transcription of the speech utterance.

For example, the AI system 102 may be communicatively coupled to a user device 806. The AI system 102 may transmit the video data and the speech utterance data along with the transcription of the speech utterance for live streaming the event. In other words, the AI system 102 provides captions corresponding to the user's speech utterance occurring in the live event, during streaming of the live event.

In some implementations, the AI system 102 or functionality of the AI system 102 may be integrated into a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The AI system 402 may also be a component of other devices or systems that may provide speech recognition functionality such as automated teller machines (ATMs), kiosks, home appliances (such as refrigerators, ovens, etc.), and vehicles (such as cars, busses, motorcycles, etc.), for different speech recognition applications.

In some cases, the AI system 102 may also provide a speech-to-text documentation to a user. For instance, the user may provide speech utterances to the user device. The user device may communicate with the AI system 102 to provide a transcription of the speech utterances. The AI system 102 may provide a text document based on the transcription. This may help users, e.g., the user 902 to write texts or maintain documents via speech input.

Figure 9:
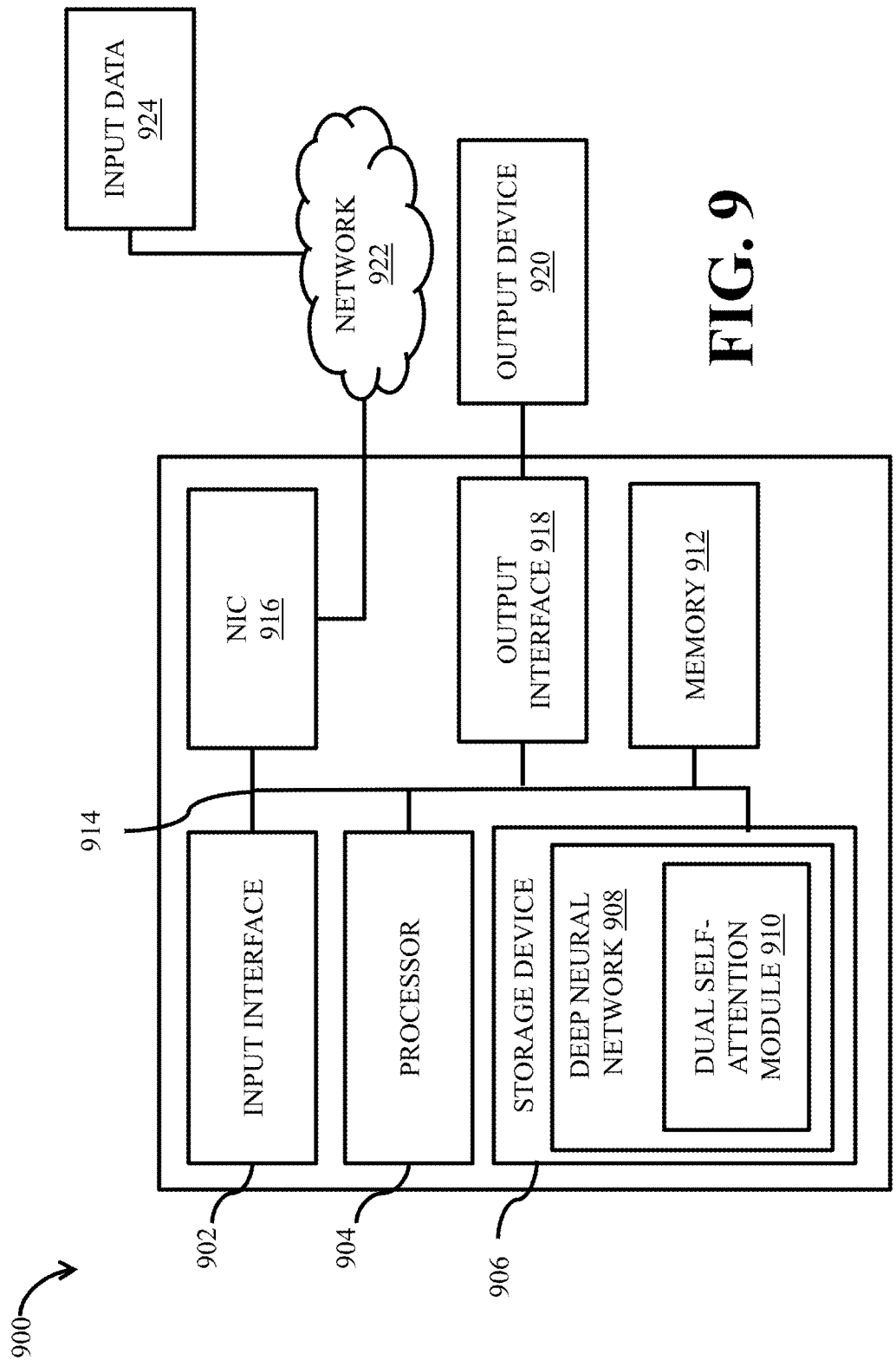
FIG. 9 shows an overall block diagram of the AI system, according to some example embodiments of the present disclosure.

FIG. 9 shows a block diagram of an AI system 900, according to some embodiments of the present disclosure. The AI system 900 corresponds to the AI system 102 of FIG. 1. The AI system 900 can have a number of interfaces connecting the AI system 900 with other systems and devices. For example, a network interface controller (NIC) 916 is adapted to connect the AI system 900 through a bus 914 to a network 922 connecting the AI system 900 with sensors. Through the network 216, either wirelessly or through wires, the AI system 900 receives input data 924 including a sequence of input frames. Additionally or alternatively, the input data 924 including the sequence of input frames may be received via an input interface 902.

The AI system 900 includes a processor 904 configured to execute stored instructions, as well as a memory 912 that stores instructions that are executable by the processor 904. The processor 904 can be a single core processor, a multi-core processor, a computing cluster, or any number of other configurations. The memory 912 can include random access memory (RAM), read only memory (ROM), flash memory, or any other suitable memory systems. The processor 904 is connected through the bus 914 to one or more input and output devices. Further the AI system 900 includes a storage device 906 adapted to store different modules including instructions executable by the processor 904. The storage device 906 can be implemented using a hard drive, an optical drive, a thumb drive, an array of drives, or any combinations thereof.

The storage device 208 is configured to store a deep neural network 908. The deep neural network 908 includes multiple layers. In an embodiment, some of the multiple layers include a dual self-attention module 910 having a dual causal and non-causal architecture attending to non-causal frames and causal frames. The processor 904 is configured to process each input frame in the sequence of input frames through layers of the deep neural network 908 to produce a sequence of outputs, and render the sequence of outputs.

According to an embodiment, the dual self-attention module 910 includes a dual self-attention outputting a causal output frames sequence derived without look-ahead and a non-causal output frames sequence derived with the look-ahead of a predetermined size with respect to an input frame representing at present time. To that end, in an embodiment, the sequence of outputs includes one or a combination of the causal output frames sequence and the non-causal output frames sequence. In an alternate embodiment, the sequence of outputs includes only the non-causal output frames sequence Additionally, the AI system 900 includes an output interface 918. The output interface 918 is configured to submit the sequence of outputs to an output device.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An artificial intelligence (AI) system adapted for data streaming applications, the AI system comprising: at least one processor; and memory having instructions stored thereon that, when executed by the at least one processor, cause the AI system to:

process each input frame in a sequence of input frames through layers of a deep neural network (DNN) to produce a sequence of outputs, wherein at least some of the layers include a dual self-attention module having a dual causal and non-causal architecture attending to non-causal frames and causal frames; and render the sequence of outputs.

2. The AI system of claim 1, wherein the causal frames attended to interpret a current frame are look-ahead frames, while the rest of the attended frames are the non-causal frames.

3. The AI system of claim 2, wherein the dual self-attention module includes dual self-attention outputting a sequence of causal output frames derived without look-ahead and a sequence of non-causal output frames derived with the look-ahead of a predetermined size with respect to an input frame representing the present time; and wherein the sequence of outputs includes one or a combination of the causal output frames and the non-causal output frames.

4. The AI system of claim 3, wherein the sequence of outputs includes only the sequence of the non-causal output frames.

5. The AI system of claim 3, wherein the causal architecture of the dual self-attention of a current layer of the DNN transforms previous causal outputs determined by the causal architecture of the dual self-attention of a previous layer of the DNN into a sequence of causal keyframes, causal value frames, and causal query frames to produce current causal outputs by attending the causal query frames to the causal keyframes to weight the causal value frames, and wherein the non-causal architecture of the dual self-attention of the current layer of the DNN transforms previous non-causal outputs determined by the non-causal architecture of the dual self-attention of the previous layer of the DNN into a sequence of non-causal keyframes, non-causal value frames, and non-causal query frames to produce current non-causal outputs by attending the non-causal query frames to the non-causal keyframes combined with causal look-ahead keyframes copied from the causal architecture to weight the non-causal value frames combined with causal look-ahead value frames copied from the causal architecture.

6. The AI system of claim 3, wherein the causal architecture of the dual self-attention of a current layer of the DNN transforms previous causal outputs determined by the causal architecture of the dual self-attention of a previous layer of the DNN into a sequence of causal keyframes, causal value frames, and causal query frames, wherein the non-causal architecture of the dual self-attention of the current layer of the DNN transforms previous non-causal outputs determined by the non-causal architecture of the dual self-attention of the previous layer of the DNN into a sequence of non-causal keyframes, non-causal value frames, and non-causal query frames, wherein the causal architecture produces current causal outputs by attending the causal query frames to causal keyframes combined with non-causal keyframes that are copied from the non-causal architecture to weight the causal value frames combined with non-causal value frames that are copied from the non-causal architecture; and wherein the non-causal architecture produces current non-causal outputs by attending the non-causal query frames to the past and present non-causal keyframes combined with the causal look-ahead keyframes copied from the causal architecture to weight the non-causal past and present value frames combined with the causal look-ahead value frames copied from the causal architecture.

7. An audio processing method, comprising:

processing each input frame in a sequence of input frames through layers of a deep neural network (DNN) to produce a sequence of outputs, wherein at least some of the layers include a dual self-attention module having a dual causal and non-causal architecture attending to non-causal frames and causal frames; and rendering the sequence of outputs.

8. The audio processing method of claim 7, wherein the causal frames attended to interpret a current frame are look-ahead frames, while the rest of the attended frames are the non-causal frames.

9. The audio processing method of claim 8, wherein the dual self-attention module includes a dual self-attention outputting a causal output frames sequence derived without look-ahead and a non-causal output frames sequence derived with the look-ahead of a predetermined size with respect to an input frame representing at present time; and wherein the sequence of outputs includes one or a combination of the causal output frames sequence and the non-causal output frames sequence.

10. The audio processing method of claim 9, wherein the sequence of outputs includes only the non-causal output frames sequence.

11. The audio processing method of claim 9, wherein the causal architecture of the dual self-attention of a current layer of the DNN transforms previous causal outputs determined by the causal architecture of the dual self-attention of a previous layer of the DNN into a sequence of causal keyframes, causal value frames, and causal query frames to produce current causal outputs by attending the causal query frames to the causal keyframes to weight the causal value frames, and wherein the non-causal architecture of the dual self-attention of the current layer of the DNN transforms previous non-causal outputs determined by the non-causal architecture of the dual self-attention of the previous layer of the DNN into a sequence of non-causal keyframes, non-causal value frames, and non-causal query frames to produce current non-causal outputs by attending the non-causal query frames to the non-causal keyframes combined with causal look-ahead keyframes copied from the causal architecture to weight the non-causal value frames combined with causal look-ahead value frames copied from the causal architecture.

12. The audio processing method of claim 9, wherein the causal architecture of the dual self-attention of a current layer of the DNN transforms previous causal outputs determined by the causal architecture of the dual self-attention of a previous layer of the DNN into a sequence of causal keyframes, causal value frames, and causal query frames, wherein the non-causal architecture of the dual self-attention of the current layer of the DNN transforms previous non-causal outputs determined by the non-causal architecture of the dual self-attention of the previous layer of the DNN into a sequence of non-causal keyframes, non-causal value frames, and non-causal query frames, wherein the causal architecture produces current causal outputs by attending the causal query frames to causal keyframes combined with non-causal keyframes that are copied from the non-causal architecture to weight the causal value frames combined with non-causal value frames that are copied from the non-causal architecture, and wherein the non-causal architecture produces current non-causal outputs by attending the non-causal query frames to the past and present non-causal keyframes combined with the causal look-ahead keyframes copied from the causal architecture to weight the non-causal past and present value frames combined with the causal look-ahead value frames copied from the causal architecture.

13. A non-transitory computer-readable storage medium embodied thereon a program executable by a processor for performing a method, the method comprising:

processing each input frame in a sequence of input frames through layers of a deep neural network (DNN) to produce a sequence of outputs, wherein at least some of the layers include a dual self-attention module having a dual causal and non-causal architecture attending to non-causal frames and causal frames; and rendering the sequence of outputs.

* * * * *